US008340048B2

United States Patent
Hashimoto et al.

(10) Patent No.: US 8,340,048 B2
(45) Date of Patent: Dec. 25, 2012

(54) MOBILE TERMINAL AND COMMUNICATION CONTROL METHOD FOR URGING A CONNECTED COMMUNICATION TERMINAL TO PERFORM A HANDOVER

(75) Inventors: Jun Hashimoto, Yokohama (JP);
Hisashi Takeshita, Yokosuka (JP);
Kentaro Itagaki, Yokosuka (JP);
Nobuaki Sasao, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 473 days.

(21) Appl. No.: 12/610,506

(22) Filed: Nov. 2, 2009

(65) Prior Publication Data

US 2010/0120439 A1    May 13, 2010

(30) Foreign Application Priority Data

Nov. 7, 2008    (JP) ................................ 2008-286651

(51) Int. Cl.
*H04W 4/00*    (2009.01)
(52) U.S. Cl. ...................... 370/331; 370/310.2; 370/349; 455/422.1; 455/432.1; 455/437; 455/438; 455/439; 455/440; 455/442
(58) Field of Classification Search ............... 370/310.2, 370/328–339, 349; 455/422.1, 432.1, 436–444
See application file for complete search history.

(56) References Cited

U.S. PATENT DOCUMENTS

| | | | |
|---|---|---|---|
| 6,909,705 B1 | 6/2005 | Lee et al. | |
| 2005/0030924 A1* | 2/2005 | Yano et al. | 370/332 |
| 2005/0070326 A1 | 3/2005 | Morton | |
| 2007/0237094 A1 | 10/2007 | Bi et al. | |
| 2009/0047898 A1* | 2/2009 | Imamura et al. | 455/7 |
| 2009/0088164 A1* | 4/2009 | Shen et al. | 455/436 |
| 2010/0118762 A1* | 5/2010 | Hashimoto et al. | 370/315 |

FOREIGN PATENT DOCUMENTS

| | | |
|---|---|---|
| JP | 2004-363700 | 12/2004 |
| JP | 2005-217994 | 8/2005 |
| JP | 2005-323034 | 11/2005 |
| JP | 2008-228012 | 9/2008 |

OTHER PUBLICATIONS

Extended European Search Report issued Oct. 29, 2010, in Patent Application No. 09175232.9.
Office Action issued Mar. 29, 2012, in Chinese Patent Application No. 200910209795.6 with English translation.
European Office Action issued Apr. 17, 2012 in patent application No. 09 175 232.9.

* cited by examiner

*Primary Examiner* — Hoon J Chung
(74) *Attorney, Agent, or Firm* — Oblon, Spivak, McClelland, Maier & Neustadt, L.L.P.

(57) ABSTRACT

An object is to urge a communication terminal connecting (or belonging) to a mobile terminal, to carry out a handover. A cell phone 1 has a relay unit 15 for relaying data transmitted between a digital camera 5 and a network, and a relay controller 17 for controlling the relay unit 15, based on a location state in a wireless LAN 3 derived based on a reception situation of a beacon from a base station 3a of the wireless LAN 3 different from a mobile communication network 2. The relay controller 17 cancels a connection to the digital camera 5 when the mobile terminal is located inside an area of the wireless LAN 3.

4 Claims, 5 Drawing Sheets

MOBILE TERMINAL AND COMMUNICATION CONTROL METHOD FOR URGING A CONNECTED COMMUNICATION TERMINAL TO PERFORM A HANDOVER

BACKGROUND OF THE INVENTION

1. Field of the Invention

The present invention relates to a mobile terminal with a data relay function, and a communication control method thereof.

2. Related Background Art

In general wireless LAN communication, an access point at public facilities or at home is connected through a broadband line to a network and a session is established between a communication terminal with a wireless LAN function and the access point to enable the communication terminal to implement communication with the network. Examples of such communication terminals with the wireless LAN function include personal computers, game machines, cell phones, and so on.

In a wireless LAN system, the communication terminal normally connects (or belongs) to an optimal access point according to conditions of radio waves sent from access points. A handover process is carried out with changeover to another optimal access point due to movement of the communication terminal. Patent Document 1 below describes a method of performing a reconnection process upon the handover in a short time even during quick movement of the communication terminal. This method is to temporarily set the number of retransmissions smaller than the preset number of retransmissions of connection cancellation information in transmission of the connection cancellation information from the communication terminal to a base station connected before the handover and thereby reduce a time from detection of a base station to be connected after the handover, to connection to the base station.

Patent Document 1: Japanese Patent Application Laid-open No. 2005-323034

SUMMARY OF THE INVENTION

If the function of the access point is loaded on such a mobile terminal as a cell phone, the communication terminal can perform communication with the network through the mobile terminal even at places where there is neither a home wireless LAN nor a public wireless LAN. However, when a user uses the mobile terminal as an access point, the mobile terminal is usually placed near the communication terminal, and thus the communication terminal connected once to the mobile terminal continues to belong to the mobile terminal. As a result, even if the communication terminal moves into an area of a home wireless LAN or public wireless LAN, it will not be handed over to a base station of the wireless LAN and the mobile terminal will continuously transmit information (a beacon signal) necessary for communication.

The present invention has been accomplished in order to solve the above problem and an object of the present invention is to provide a mobile terminal capable of urging a communication terminal connecting (or belonging) thereto, to carry out a handover, and a communication control method thereof.

A mobile terminal according to the present invention is a mobile terminal comprising: relay means for relaying data transmitted between another communication terminal and a network; and control means for controlling the relay means, based on a location state in a radio communication network derived based on a reception situation of a signal from a base station of the radio communication network different from a mobile communication network, wherein the control means cancels a connection to the another communication terminal when the mobile terminal is located inside an area of the radio communication network.

A communication control method according to the present invention is a communication control method in a mobile terminal with relay means for relaying data transmitted between another communication terminal and a network, the communication control method comprising: a control step of controlling the relay means, based on a location state in a radio communication network derived based on a reception situation of a signal from a base station of the radio communication network different from a mobile communication network, wherein the control step is to cancel a connection to the another communication terminal when the mobile terminal is located inside an area of the radio communication network.

Since the mobile terminal and the communication control method as described above are configured to cancel the connection to the another communication terminal connecting to the mobile terminal, when the mobile terminal moves into the area of the radio communication network, the communication terminal stops belonging to the mobile terminal. The communication terminal is given a chance of the handover in this manner, whereby the communication terminal connecting (or belonging) to the mobile terminal is urged to carry out the handover.

The mobile terminal of the present invention is preferably configured as follows: it further comprises monitoring means for monitoring a connection request signal transmitted from the another communication terminal the connection to which was cancelled; the control means deactivates the relay means if a destination of the connection request signal monitored by the monitoring means is the base station of the radio communication network, and establishes a connection to the another communication terminal in order to relay data communication associated with the another communication terminal if the destination is the mobile terminal.

In this case, the monitoring means monitors to which access point the another communication terminal stopping belonging to the mobile terminal transmits the connection request signal. If the communication terminal requests the connection to the base station of the radio communication network, the relay means of the mobile terminal is deactivated; if the communication terminal requests the connection to the mobile terminal, the communication terminal is again connected to the mobile terminal. As the relay function (access point function) is operated only if a connection is again requested by the communication terminal the connection to which was cancelled, the power of the mobile terminal consumed for the relay function can be reduced.

Since these mobile terminal and communication control method are configured to cancel the connection to the another communication terminal connecting to the mobile terminal when the mobile terminal moves into the area of the radio communication network, the communication terminal connecting (or belonging) to the mobile terminal can be urged to carry out the handover.

DESCRIPTION OF THE PREFERRED EMBODIMENTS

Embodiments of the present invention will be described below in detail with reference to the accompanying drawings. In the embodiments the mobile terminal according to the present invention is applied to a cell phone. In the description of the drawings identical or equivalent elements will be denoted by the same reference symbols, without redundant description.

Figure 1:
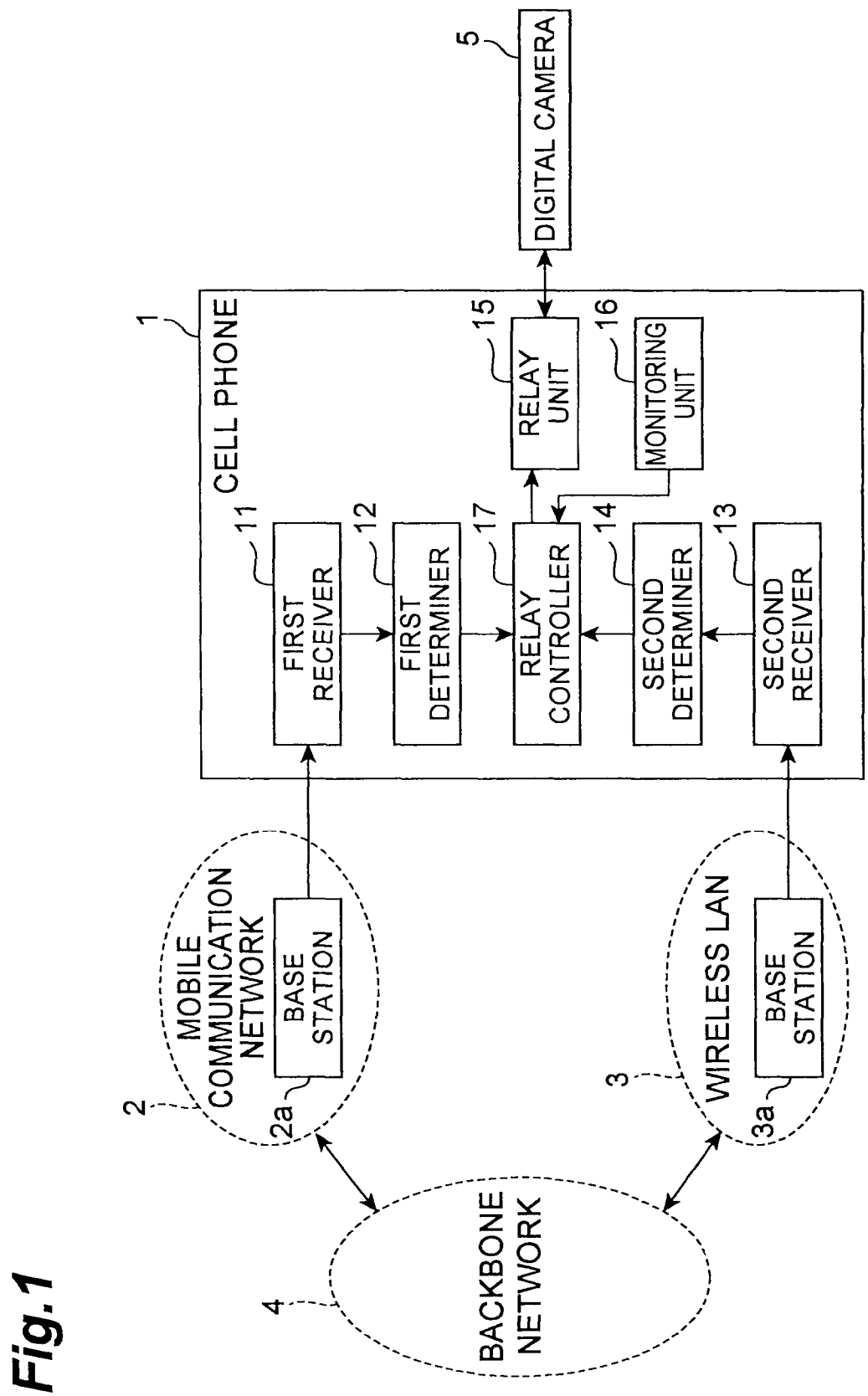
FIG. 1 is a drawing showing a functional configuration of a cell phone according to an embodiment.
Figure 2:
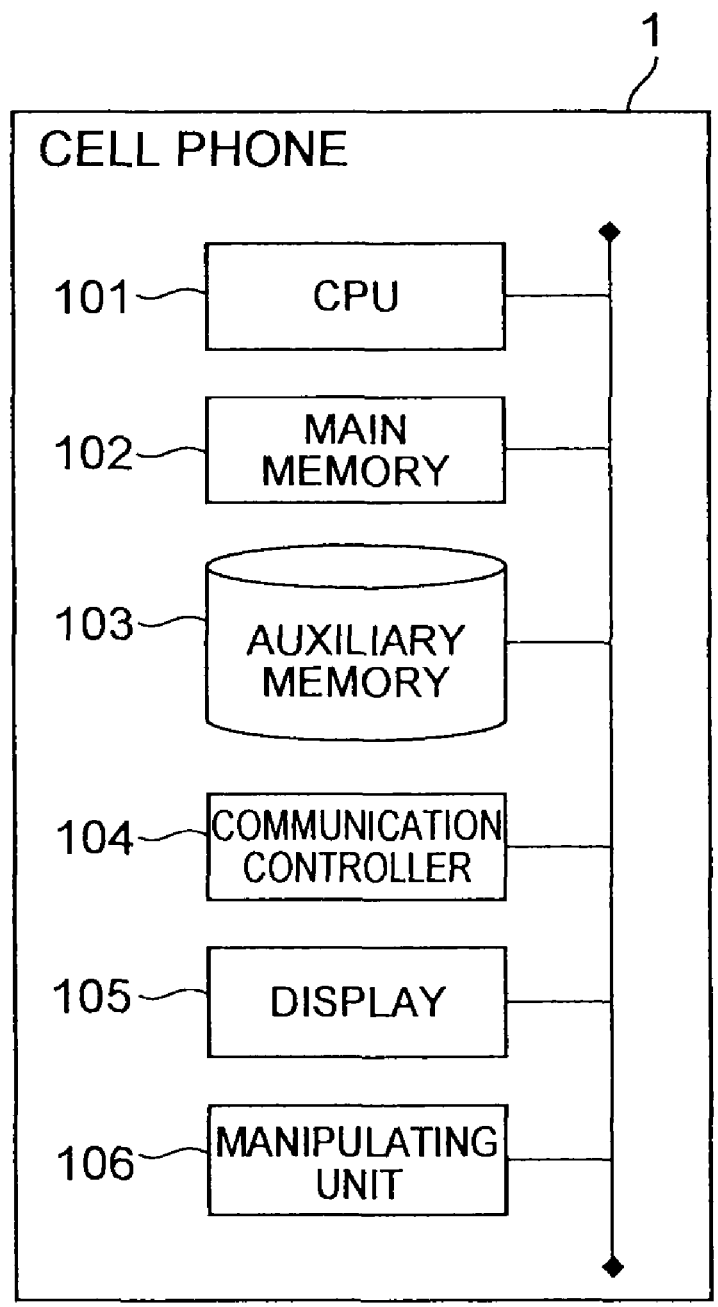
FIG. 2 is a drawing showing a hardware configuration of the cell phone shown in FIG. 1.

First, configurations and functions of a cell phone according to an embodiment will be described using FIGS. 1 and 2. FIG. 1 is a drawing showing a functional configuration of the cell phone. FIG. 2 is a drawing showing a hardware configuration of the cell phone.

As shown in FIG. 1, the cell phone 1 can communicate with a mobile communication network 2 through transmission and reception of signals to and from a base station 2a forming the mobile communication network 2. Furthermore, the cell phone 1 can also communicate with a wireless LAN 3 through transmission and reception of signals to and from a base station 3a forming the wireless LAN 3. It is noted herein that the wireless LAN 3 is a communication network different from the mobile communication network 2. The mobile communication network 2 and the wireless LAN 3 are connected each to a backbone network 4.

The cell phone is equipped with an access point function to relay data transmitted between a digital camera (another communication terminal) 5 and the network. The digital camera 5 is equipped with a wireless LAN function.

The cell phone 1 has the following functional components: first receiver 11, first determiner 12, second receiver 13, second determiner 14, relay unit (relay means) 15, monitoring unit (monitoring means) 16, and relay controller (control means) 17.

As shown in FIG. 2, the cell phone 1 is composed of a CPU 101 to execute an operating system, an application program, and others, a main memory unit 102 composed of a ROM and a RAM, an auxiliary memory unit 103 composed of a memory or the like, a communication control unit 104 to perform data communication through the mobile communication network 2 or the wireless LAN 3, a display unit 105 composed of a liquid crystal monitor or the like, and an operation unit 106 composed of input keys or the like. Each of the functions shown in FIG. 1 is implemented by making predetermined software retrieved onto the CPU 101 and main memory unit 102, operating the communication control unit 104 under control of the CPU 101, and reading and writing data from and into the main memory unit 102 or the auxiliary memory unit 103.

Referring back to FIG. 1, the first receiver 11 is a part that receives broadcast information (signal) from the base station 2a of the mobile communication network 2. The first receiver 11 outputs the received broadcast information to the first determiner 12.

The first determiner 12 is a part that determines a location state of the cell phone 1 in the mobile communication network 2, based on a reception situation of the signal from the base station 2a of the mobile communication network 2. For example, the first determiner 12 determines that the cell phone 1 is located inside the area of the mobile communication network 2, if the first receiver 11 receives the broadcast information; otherwise, it determines that the cell phone 1 is located outside the area of the mobile communication network 2. The first determiner 12 outputs the determination result as first location information to the relay controller 17. The first location information is information indicative of whether the cell phone 1 is located in the mobile communication network 2 and, as described above, it is derived based on the reception situation of the broadcast information from the base station 2a of the mobile communication network 2.

The second receiver 13 is a part that receives a beacon (signal) from the base station 3a of the wireless LAN 3. The second receiver 13 outputs the received beacon to the second determiner 14.

The second determiner 14 is a part that determines a location state of the cell phone 1 in the wireless LAN 3, based on a reception situation of the signal from the base station 3a of the wireless LAN 3. For example, the second determiner 14 determines that the cell phone 1 is located inside the area of the wireless LAN 3, if the second receiver 13 receives the beacon; otherwise, it determines that the cell phone 1 is located outside the area of the wireless LAN 3. Then the second determiner 14 outputs the determination result as second location information to the relay controller 17. The second location information is information indicative of whether the cell phone 1 is located in the wireless LAN 3 and, as described above, it is derived based on the reception situation of the beacon from the base station 3a of the wireless LAN 3.

The relay unit 15 is a part that relays data transmitted between the digital camera (another communication terminal) 5 and the network. The relay unit 15 initiates or terminates transmission of a beacon according to a control signal input from the relay controller 17 described below. When a connection is established between the cell phone 1 and the digital camera 5 by transmission of the beacon, the relay unit 15 becomes able to relay data transmitted between the digital camera 5 and the mobile communication network 2 and data transmitted between the digital camera 5 and the backbone network 4. At this time, the cell phone 1 functions as an access point.

The relay unit 15 also functions to cancel the connection to the digital camera 5 and to deactivate the relay function in accordance with a control signal fed from the relay controller 17. The relay unit 15 transmits a belonging cancellation message such as disauthentication (de-authentication) or disassociation to the digital camera 5 to cancel the connection to the digital camera 5. However, the connection cancellation (belonging cancellation) method is not limited only to this. For example, the relay unit 15 may execute the connection cancellation by reducing the transmission power or by forcibly changing (or resetting) a radio setting such as a service set identifier (SSID).

The monitoring unit 16 is a part that monitors a connection request signal transmitted from the digital camera 5 the connection to which was cancelled. This connection request signal is specifically a probe request. The monitoring unit 16 receives the probe request, checks the SSID included in the request, and determines to which the digital camera 5 requests a connection. Since the probe request is a broadcast signal, the monitoring unit 16 can also monitor the probe request which the digital camera 5 transmitted to the wireless LAN 3. The monitoring unit 16 generates connection request information indicative of a destination of the probe request (object requested to connect to the digital camera 5) and outputs the connection request information to the relay controller 17.

The relay controller 17 is a part that controls the relay unit 15, based on a location state in the wireless LAN 3 derived based on a reception situation of the signal from the base station 3a of the wireless LAN 3. The relay controller 17 controls the relay unit 15, based on the first location information and the second location information.

With input of the first location information indicative of the location inside the area of the mobile communication network 2 and input of the second location information indicative of the location outside the area of the wireless LAN 3, the relay controller 17 determines that the relay unit is to be activated. Then the relay controller 17 generates a control signal for controlling the relay unit 15 to transmit a beacon, and outputs it to the relay unit 15. This makes the relay unit 15 start transmission of the beacon or continue its transmission process. As a result, the access point function of the cell phone 1 is activated and the digital camera 5 becomes connectable to the network.

If the relay controller 17 receives input of the second location information indicative of the location inside the area of the wireless LAN 3 while the cell phone 1 connects to the digital camera 5 or while the digital camera 5 belongs to the cell phone 1, it determines that the connection to the digital camera 5 is to be cancelled. Then the relay controller 17 generates a control signal for cancelling the connection to the digital camera 5, and outputs it to the relay unit 15. This makes the relay unit 15 cancel the connection to the digital camera 5.

Thereafter, when the connection request information is fed from the monitoring unit 16, the relay controller 17 controls the relay unit 15, based on the signal. Specifically, when the input is the connection request information indicating that the digital camera 5 requests a connection to the base station 3a of the wireless LAN 3, the relay controller 17 determines that the access point function is to be deactivated. Then the relay controller 17 generates a control signal for deactivating the relay unit 15, and outputs it to the relay unit 15. On the other hand, when the input is the connection request information indicating that the digital camera 5 requests a connection to the cell phone 1, the relay controller 17 determines that the cell phone is to connect to the digital camera 5. Then the relay controller 17 generates a control signal for controlling the relay unit to transmit a beacon, and outputs it to the relay unit 15. In this case, the access point function of the cell phone 1 is resumed and the relay unit 15 connects to the digital camera 5 in order to relay data communication associated with the digital camera 5.

Figure 3:
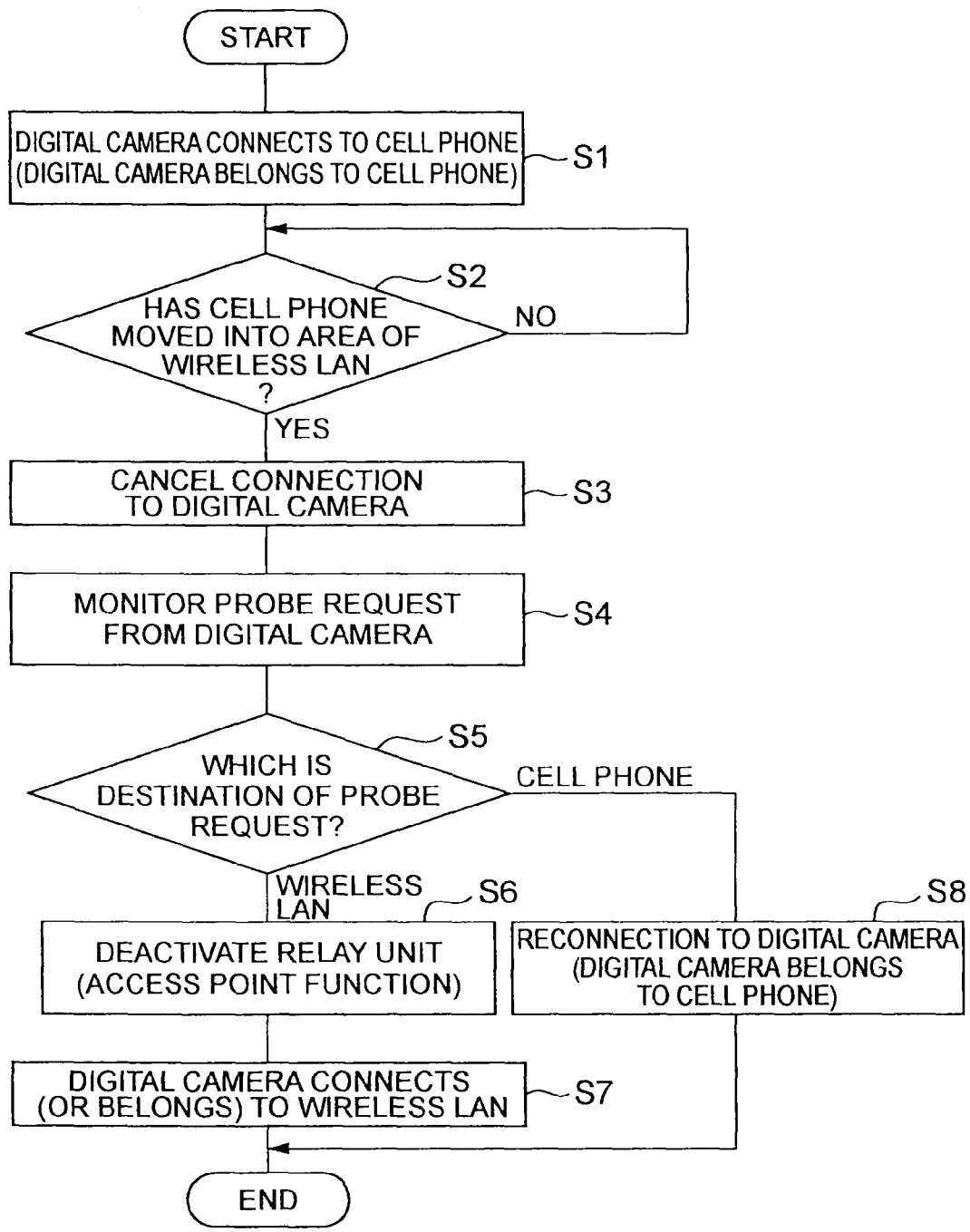
FIG. 3 is a flowchart showing an operation of the cell phone shown in FIG. 1.
Figure 4:
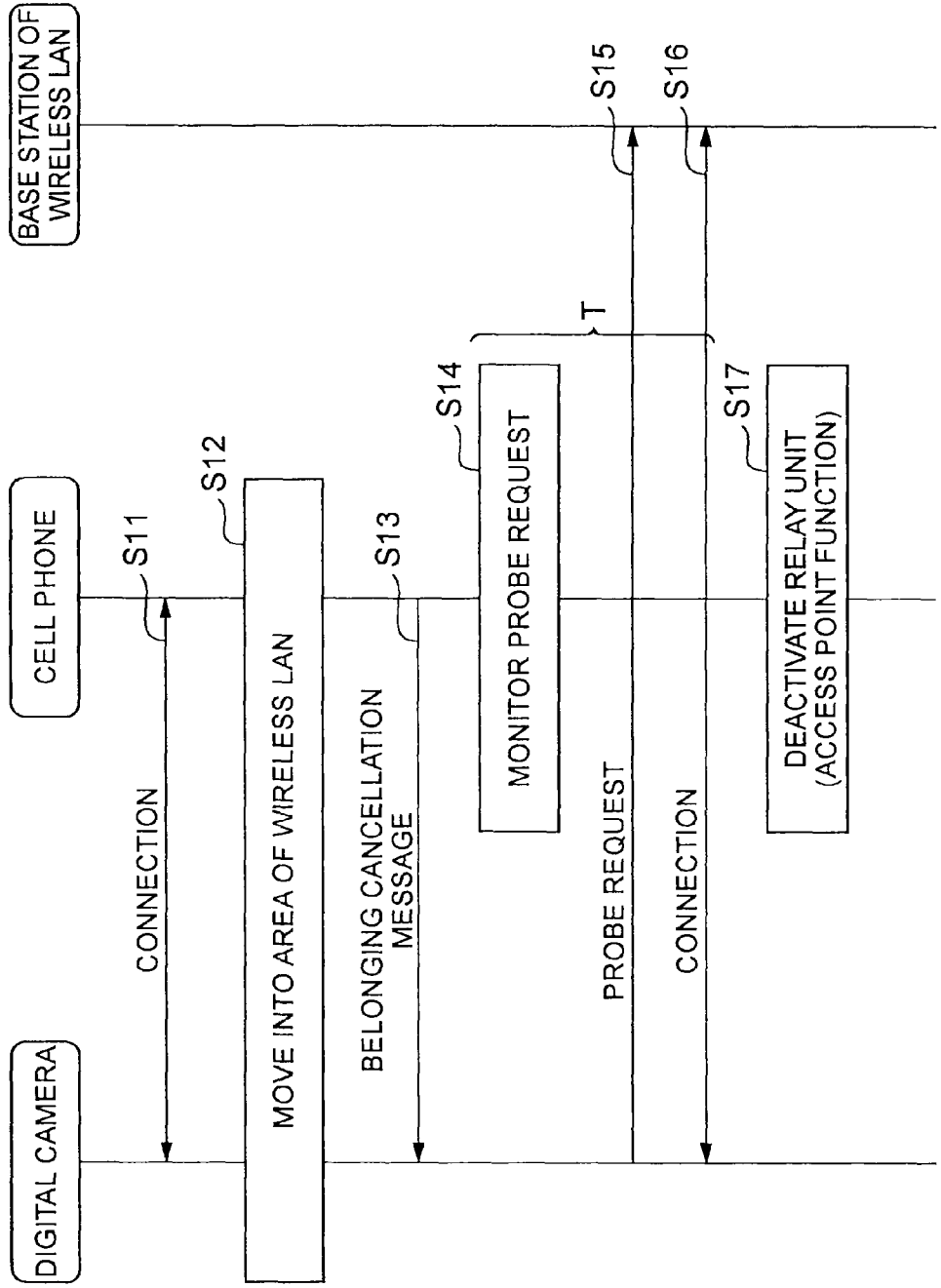
FIG. 4 is a sequence diagram showing a cooperative operation among a cell phone, a digital camera, and a wireless LAN.
Figure 5:
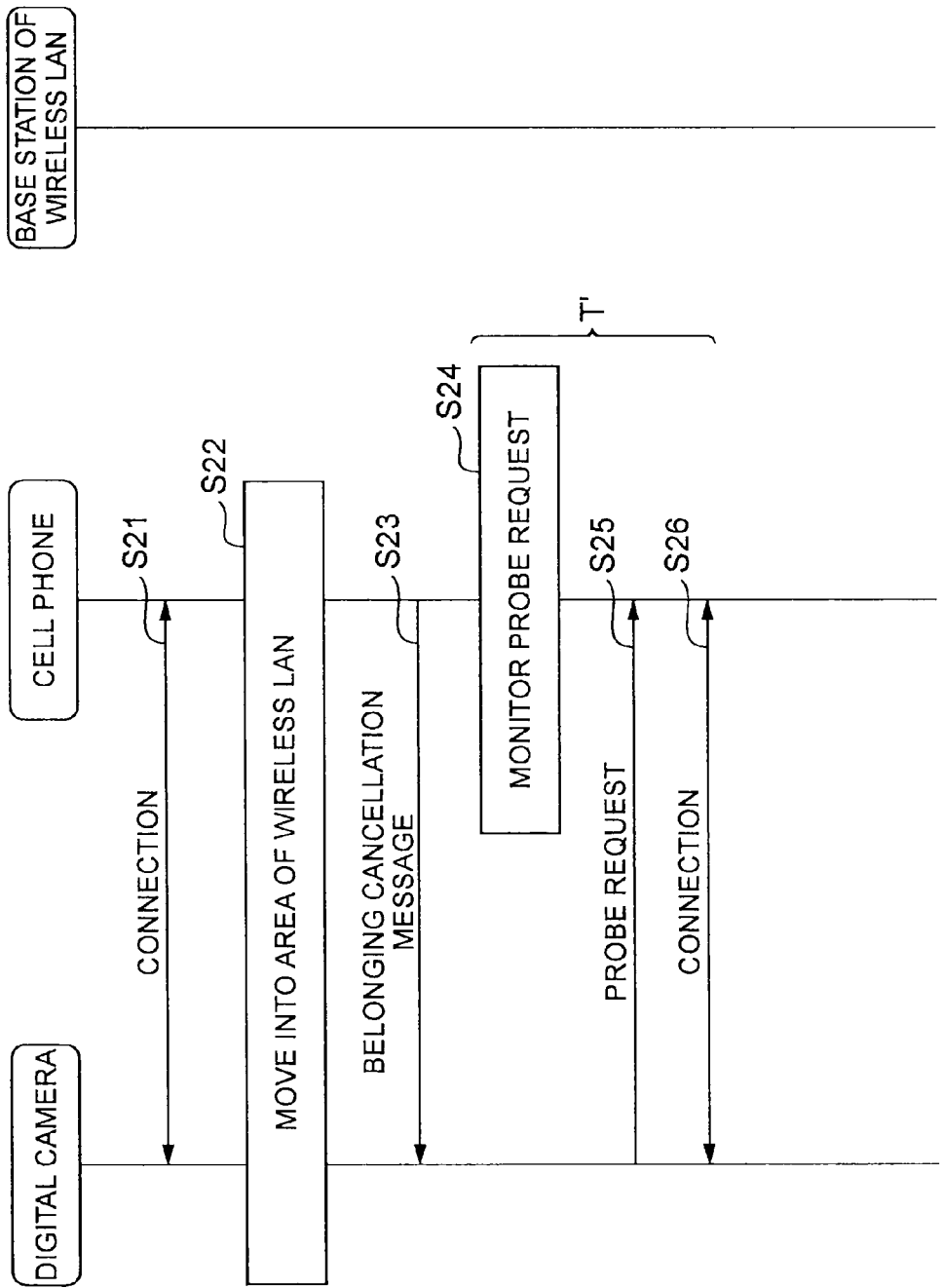
FIG. 5 is a sequence diagram showing a cooperative operation among a cell phone, a digital camera, and a wireless LAN.

The below will describe the operation of the cell phone shown in FIG. 1 and a communication control method according to the present embodiment, using FIGS. 3 to 5. FIG. 3 is a flowchart showing the operation of the cell phone. FIGS. 4 and 5 are sequence diagrams showing cooperative operations among the cell phone, the digital camera, and the wireless LAN.

It is assumed that the cell phone 1 is connected to the digital camera 5 and that the cell phone 1 is functioning as an access point of the digital camera 5 (step S1). Thereafter, when the second determiner 14 determines that the cell phone 1 has moved into the area of the wireless LAN 3 (step S2; YES), the relay controller 17 determines that the connection to the digital camera 5 is to be cancelled, and the relay unit 15 executes the connection cancellation process, based on the determination (step S3, control step).

Thereafter, the monitoring unit 16 monitors the probe request transmitted from the digital camera (step S4) and judges the destination of the request. If the destination is the base station 3a of the wireless LAN 3 (step S5; wireless LAN), the relay controller 17 determines that the access point function is to be deactivated, and the relay unit 15 is deactivated based on the determination (step S6). At this time, the digital camera 5 connects to the wireless LAN 3 and becomes able to execute data communication with the network through the wireless LAN 3 (step S7).

On the other hand, if the destination of the probe request is the cell phone 1 (step S5; cell phone), the relay controller 17 determines that the cell phone is to again connect to the digital camera 5, and the relay unit 15 resumes the access point function (step S8). This makes the digital camera 5 belong to the cell phone 1 and allows the digital camera 5 to execute data communication with the network through the cell phone 1.

When the digital camera 5 switches its access point from the cell phone 1 to the wireless LAN 3, the processing as shown in FIG. 4 is carried out. Specifically, while the cell phone 1 and the digital camera 5 connect to each other (step S11), these devices move into the area of the wireless LAN 3 (step S12), and, based on the determination of the relay controller 17, the relay unit 15 sends a belonging cancellation message to the digital camera 5 (step S13, control step). This results in cancelling the connection between the cell phone 1 and the digital camera 5.

Thereafter, the monitoring unit 16 monitors the probe request from the digital camera 5 (step S14). This monitoring operation is continuously executed during a period of time T until the destination of the probe request is figured out. Thereafter, the digital camera 5 sends the probe request to the base station 3a of the wireless LAN 3 (step S15). This causes the digital camera 5 to connect to the wireless LAN 3, thereby completing the handover (step S16). On the other hand, the relay controller 17 deactivates the relay unit 15 in the cell phone 1 (step S17).

When the digital camera 5 again uses the cell phone 1 as an access point, the processing as shown in FIG. 5 is carried out. First, the processes of steps S21 to S24 are the same as those of steps S11 to S14. The monitoring unit 16 continuously executes the monitoring process during a period of time T' until the destination of the probe request is figured out. Thereafter, the digital camera 5 transmits the probe request to the cell phone 1, e.g., for the reason of failure in connection to the wireless LAN 3 (step S25). Then the digital camera 5 again connects to the cell phone 1 (step S26).

In the present embodiment, as described above, when the cell phone 1 moves into the area of the wireless LAN 3, the connection to the digital camera 5 connecting to the cell phone 1 is cancelled and thus the digital camera 5 stops belonging to the cell phone 1. As the digital camera 5 is given a chance of a handover in this manner, the digital camera 5 connecting (or belonging) to the cell phone 1 is urged to carry out the handover.

According to the present embodiment, the cell phone 1 is configured to monitor the probe request transmitted from the digital camera 5 which stopped belonging to the cell phone 1. If the digital camera 5 requests a connection to the base station 3a of the wireless LAN 3, the relay unit 15 of the cell phone 1 is deactivated; if the digital camera 5 requests a connection to the cell phone 1, the cell phone again connects to the digital camera 5. Since the relay function (access point function) is operated only when the connection is again requested by the digital camera 5 the connection of which was cancelled, the power of the cell phone 1 consumed for the relay function can be reduced. Furthermore, convenience is improved because the handover process of the digital camera 5 is automatically carried out.

The present invention was described above in detail based on the embodiment thereof. However, the present invention is not limited only to the above embodiment. The present invention can be modified in many ways as described below, without departing from the scope and spirit of the invention.

The above embodiment showed the example wherein the cell phone 1 determined the location situation in the wireless LAN 3, but it is also possible to adopt a configuration wherein the digital camera 5 determines the location situation in the wireless LAN 3 and notifies the cell phone 1 of the determination result (equivalent to the second location information in the above embodiment). This configuration eliminates the need for the mobile terminal to determine the location situation in the radio communication network and thus reduces the load on the mobile terminal.

The above embodiment showed the wireless LAN 3 as the radio communication network, but there are no restrictions on the type of the radio communication network. For example, the present invention is also applicable to systems using WiMAX (Worldwide Interoperability for Microwave Access). Furthermore, there are no restrictions on the type of the mobile communication network, either. For example, the present invention is also applicable to systems using W-CDMA (Wideband Code Division Multiple Access), CDMA-2000, or LTE (Long Term Evolution).

The above embodiment showed the example of the cell phone 1 and the digital camera 5 as the mobile terminal and the another communication terminal, but there are no restrictions on the type of the mobile terminal, and the type of the communication terminal configured to communicate through the mobile terminal. For example, a personal digital assistant (PDA) can be the mobile terminal and a portable game machine or portable music player can be the another communication terminal.

What is claimed is:

1. A mobile terminal comprising:
   a first receiver configured to receive a signal from a base station of a mobile communication network;
   a relay device that relays data transmitted between another communication terminal and the mobile communication network; a second receiver configured to receive a signal from a base station of a radio communication network different from the mobile communication network; and
   a controller that controls the relay device, based on a location state in the radio communication network derived based on a reception situation of the signal from the base station of the radio communication network,
   wherein the controller cancels a connection to the another communication terminal when the controller determines that the mobile terminal has moved into an area of the radio communication network based on the location state and when the mobile terminal is located inside an area of the radio communication network and when the another communication terminal is not connected to the base station of the radio communication network.

2. The mobile terminal according to claim 1, further comprising:
   a monitoring device that monitors a connection request signal transmitted from the another communication terminal to which the connection was cancelled,
   wherein the controller deactivates the relay device if a destination of the connection request signal monitored by the monitoring device is the base station of the radio communication network, and establishes a new connection to the another communication terminal in order to relay data communication associated with the another communication terminal if the destination of the connection request signal is the mobile terminal.

3. The mobile terminal according to claim 1, wherein the controller cancels the connection to the another communication terminal to urge the another communication terminal to carry out a handover.

4. A communication control method in a mobile terminal with a relay device that relays data transmitted between another communication terminal and a mobile communication network, the communication control method comprising:
   receiving, by a first receiver of the mobile terminal, a signal from a base station of the mobile communication network;
   relaying, by the relay device, the data transmitted between the another communication terminal and the mobile communication network;
   receiving, by a second receiver of the mobile terminal, a signal from a base station of a radio communication network different from the mobile communication network; and
   controlling the relay device, based on a location state in the radio communication network derived based on a reception situation of the signal from the base station of the radio communication network,
   wherein the controlling the relay device includes canceling a connection to the another communication terminal when determining that the mobile terminal has moved into an area of the radio communication network based on the location state and when the mobile terminal is located inside an area of the radio communication network and when the another communication terminal is not connected to the base station of the radio communication network.

* * * * *